J. A. BRADLEY.
SPRING WHEEL.
APPLICATION FILED MAR. 15, 1919.
1,323,005.
Patented Nov. 25, 1919.
2 SHEETS—SHEET 1.
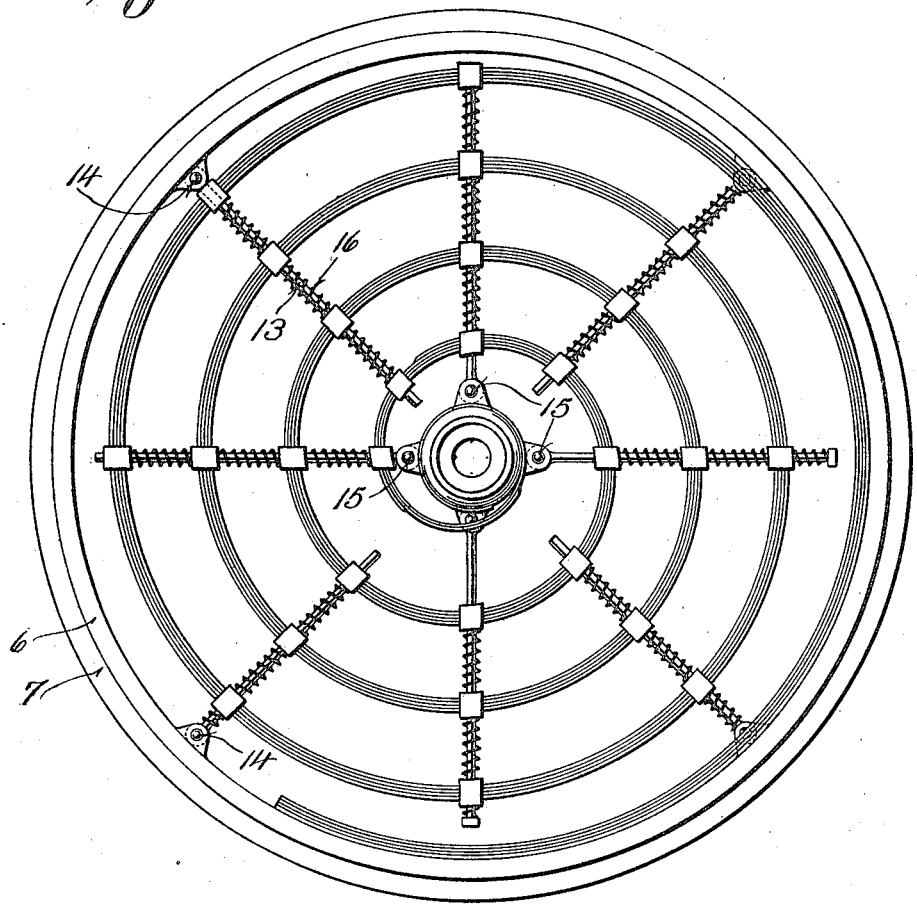
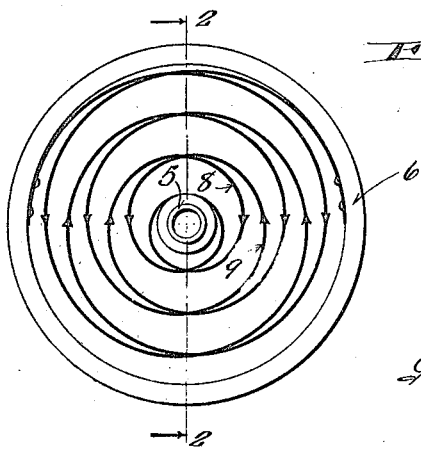
WITNESS
INVENTOR
Jacob A. Bradley
BY
Young & Young
ATTORNEY J. A. BRADLEY.
SPRING WHEEL.
APPLICATION FILED MAR. 15, 1919.
1,323,005.
Patented Nov. 25, 1919.
2 SHEETS—SHEET 2.
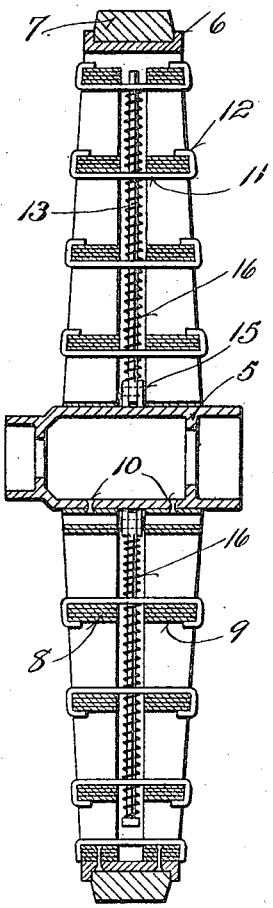
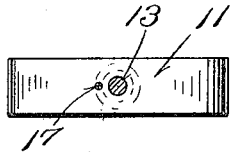
WITNESS
INVENTOR
BY
ATTORNEY

UNITED STATES PATENT OFFICE.

JACOB A. BRADLEY, OF MILWAUKEE, WISCONSIN, ASSIGNOR OF ONE-HALF TO FRANK P. BOOZ, OF MILWAUKEE, WISCONSIN.

SPRING-WHEEL.

1,323,005.   Specification of Letters Patent.   Patented Nov. 25, 1919.

Application filed March 15, 1919. Serial No. 282,972.

*To all whom it may concern:*

Be it known that I, JACOB A. BRADLEY, a citizen of the United States, and resident of Milwaukee, in the county of Milwaukee and State of Wisconsin, have invented certain new and useful Improvements in Spring-Wheels; and I do hereby declare that the following is a full, clear, and exact description thereof.

My invention relates to new and useful improvements in resilient vehicle wheels, more particularly of that type wherein metallic springs are disposed between the hub and rim portions of the wheel to resiliently hold the wheel portions in proper relation.

It is in general the object of my invention to simplify and otherwise improve the construction and to increase the efficiency of wheels of this character particularly with respect to the provision of a desired maximum range of resilient action and a most sensitive response in taking up the various stresses incidental to travel of the wheel.

It is more particularly my object to provide a wheel wherein the hub and rim portions are held in proper relation by spring elements extending in spiral convolutions between the hub and rim portions, and wherein means are provided for holding the convolutions of the spring members in proper relative position.

A further object resides in the provision of a supplemental spring structure operative transversely between the convolutions of the main spring elements.

With the above and other objects in view, which will be apparent as the description proceeds, my invention resides in the novel features of construction, combination and arrangement of parts as hereinafter described and defined by the appended claims, it being understood that changes in the precise embodiment might be made by those skilled in the art, without departing from the spirit of the invention.

In the accompanying drawings:

Figure 1 is a side elevational view of a spring wheel constructed in accordance with my invention, the remote series of main spring elements being eliminated for the purpose of clarity.

Fig. 2 is a sectional view taken through the wheel on the line 2—2 of Fig. 1.

Fig. 3 is a detail view of one of the pin holding clip plates.

Fig. 4 is a diagrammatic view showing the relation of the main series of springs, and Fig. 5 shows a modified means for mounting the transverse spring elements.

Referring now more particularly to the accompanying drawings, 5 designates any suitable hub member and 6 designates a felly carrying a suitable tread annulus 7.

The major spring elements of my improved wheel comprise two main laminated springs 8 and 9 respectively arranged in spiral convolutions between the hub and rim members, each of these springs having approximately four convolutions, the leaf lengths of the inner end of each main spring are successively reduced whereby but a single leaf thickness or lamination is afforded at the points 10 of securement to the hub, the full laminations of the springs, comprising four thicknesses in the present instance, being provided at the outer ends of the series which are secured to the felly. As shown particularly in Fig. 4, the convolutions of the series of springs wind in opposite directions, thus procuring an even action upon application of stresses. The laminations of the springs are also preferably taperingly increased in width toward the hub of the wheel, as shown in Fig. 2 and the inner sides of the springs are spaced apart.

For connecting the springs and holding their laminations together, clip plates 11 are provided extending transversely of the convolutions of the springs and have their ends bent at 12 about the outer side of the springs. These clip plates are arranged in radial series and a radial connecting rod 13 is loosely passed through each series of clip plates, alternate rods being hinged at 14 to the felly with their inner ends spaced from the hub, while the remaining rods are hinged at 15 to the hub and have their outer ends spaced from the felly. A supplemental spring holding means is afforded by coil springs 16 mounted on the rods 13, said springs being preferably of sufficient length to extend through the series of clip plates 13 and being assembled with said clip plates by rotative threading movement on the rod, the spring passing through openings 17 in the clip plates in such threaded movement as will be clearly understood by reference to Fig. 3. It will be however, appreciated that other means of providing a supplemental spring action may be afforded, for instance as shown by the modified structure of Fig. 5 wherein springs 18 are provided each of sufficient length to extend between the pad of convolutions and having their ends gaged on bosses 19 projecting from the convolution clips.

By the aforedescribed structure, a resilient wheel is provided which will effectively and readily absorb the various shocks and stresses incidental to travel of a vehicle which it supports. The opposite winding of the convolutions of the main springs insure an even action in starting rotation of the wheel in either direction, and the springs 16 serve to gradually take up major stresses when imparted to the wheel whereby said wheel may efficiently support relatively great loads without interfering with a desired freedom and quickness of action under light loads. While I have shown and described a preferred embodiment of my invention, it will be appreciated that various changes and modifications of structure to meet different conditions of use may be employed without departing in any manner from the spirit of my invention.

What is claimed is:

1. A spring wheel comprising a hub member, a rim member, a spirally coiled spring extending between and secured to the rim and hub members, and a series of rods extending radially between the rim and hub members and loosely connected with the convolutions of said spring.

2. A spring wheel comprising a hub member, a rim member, a spirally coiled spring extending between and secured to the rim and hub members, and a series of rods extending radially between the rim and hub members and loosely connected with the convolutions of said spring, certain of said rods being connected with the tread member.

3. A spring wheel comprising a hub member, a rim member, a spirally coiled spring extending between and secured to the rim and hub members, and a series of rods extending radially between the rim and hub members and loosely connected with the convolutions of said spring, alternate rods being pivoted to the tread member and the other rods being pivoted to the hub member.

4. A spring wheel comprising a hub member, a rim member, a spirally coiled spring extending between and secured to the rim and hub members, and a series of rods extending radially between the rim and hub members and loosely connected with the convolutions of said spring, and coil springs disposed between the convolutions of the main spring.

5. A spring wheel comprising a tread member, a hub member, a pair of springs disposed between the tread and hub members and secured thereto, said springs being spirally wound in opposite convolutions, members connecting adjacent convolutions of the springs, said connecting members being arranged in radial series and radial rods loosely connecting with said series of connected members.

In testimony that I claim the foregoing I have hereunto set my hand at Milwaukee, in the county of Milwaukee and State of Wisconsin.

JACOB A. BRADLEY.